United States Patent
Baone et al.

(10) Patent No.: US 10,291,025 B2
(45) Date of Patent: May 14, 2019

(54) SYSTEMS AND METHODS FOR IMPROVED STABILITY OF POWER SYSTEMS

(71) Applicant: General Electric Company, Schenectady, NY (US)

(72) Inventors: Chaitanya Ashok Baone, Glenville, NY (US); Naresh Acharya, Schenectady, NY (US); Nilanjan Ray Chaudhuri, Fargo, ND (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 882 days.

(21) Appl. No.: 14/693,590

(22) Filed: Apr. 22, 2015

(65) Prior Publication Data

US 2016/0315471 A1    Oct. 27, 2016

(51) Int. Cl.
*H02J 3/10* (2006.01)
*H02J 3/24* (2006.01)
*G05B 15/02* (2006.01)

(52) U.S. Cl.
CPC .............. *H02J 3/10* (2013.01); *G05B 15/02* (2013.01); *H02J 3/24* (2013.01)

(58) Field of Classification Search
None
See application file for complete search history.

(56) References Cited

U.S. PATENT DOCUMENTS

| | | | |
|---|---|---|---|
| 2006/0030972 A1* | 2/2006 | Schlueter | H02J 3/00 700/292 |
| 2009/0088990 A1 | 4/2009 | Schweitzer, III et al. | |
| 2009/0200872 A1 | 8/2009 | Johansson | |
| 2011/0175750 A1* | 7/2011 | Anderson | G01D 4/004 340/870.16 |
| 2012/0232820 A1 | 9/2012 | Wilson | |
| 2013/0100564 A1 | 4/2013 | Zhang et al. | |
| 2013/0234680 A1 | 9/2013 | Kolwalker et al. | |
| 2015/0005967 A1* | 1/2015 | Johannsson | H02J 3/24 700/287 |
| 2015/0105927 A1* | 4/2015 | Baone | G05F 1/66 700/292 |
| 2016/0218510 A1* | 7/2016 | Harnefors | H02J 3/36 |

OTHER PUBLICATIONS

Takimoto et al., "Contingency Selection Method for On-line Small Signal Stability Monitoring", Jul. 2002, Electrical Engineering in Japan, vol. 145, No. 4, pp. 815-820 Year: 2002).*

(Continued)

*Primary Examiner* — Jason Lin
(74) *Attorney, Agent, or Firm* — GE Global Patent Operation; Nitin Joshi

(57) ABSTRACT

The embodiments described herein provide for a system including a processor. The processor is configured to select at least one grid system contingency from a plurality of grid system contingencies. The processor is further configured to derive one or more eigen-sensitivity values based on the at least on grid system contingency. The processor is also configured to derive one or more control actions at least partially based on the eigen-sensitivity values. The processor is additionally configured to apply the one or more control actions for generation re-dispatch of a grid system.

17 Claims, 5 Drawing Sheets

(56) References Cited

OTHER PUBLICATIONS

Yeu, "Small Signal Analysis of power systems: Eigenvalue Tracking Method and Eigenvalue estimation Contingency Screening for DSA", 2010, University of Illinois at Urbana—Champaign, pp. 1-167 (Year: 2010).*

Chung et al. "Generation Rescheduling Methods to Improve Power Transfer Capability Constrained by Small-Signal Stability", Feb. 2004, IEEE transactions on power systems, vol. 19, No. 1, pp. 524-530 (Year: 2004).*

Liu et al., "Transmission Grid Vulnerability Assessment by Eigen-Sensitivity and Cut-Set Screening", IEE PES T&D, pp. 1-8, Apr. 19, 2010.

European Search Report and Opinion issued in connection with corresponding EP Application No. 16166051.9 dated Aug. 18, 2016.

Karapidakis et al., "On-Line Preventive Dynamic Security of Isolated Power Systems Using Decision Trees", Power Engineering Review, IEEE, vol. 22, Issue 4, pp. 1-4, Apr. 2002.

Chung et al., "Generation rescheduling methods to improve power transfer capability constrained by small-signal stability", Power Systems, IEEE Transactions on, vol. 19, Issue 1, pp. 524-530, Feb. 2004.

Huang et al., "MANGO—Modal Analysis for Grid Operation: A Method for Damping Improvement through Operating Point Adjustment", U. S. Department of Energy under Contract DE-AC05-76RL01830, pp. 1-92, Oct. 2010.

Diao et al., "Deriving optimal operational rules for mitigating inter-area oscillations", Power Systems Conference and Exposition (PSCE), 2011 IEEE/PES, pp. 1-8, Mar. 2011.

Huang et al., "Use of Modal Sensitivity to Operating Conditions for Damping Control in Power Systems", System Sciences (HICSS), 2011 44th Hawaii International Conference on, pp. 1-9,2011.

Mendoza, "A formula for damping interarea oscillations with generator redispatch", Bulk Power System Dynamics and Control—IX Optimization, Security and Control of the Emerging Power Grid (IREP), 2013 IREP Symposium, pp. 1-8, Aug. 2013.

Huang, Z., et al., "Improving Small Signal Stability through Operating Point Adjustment," IEEE Conference on Power and Energy Society General Meeting, pp. 1-3 (2010) (Abstract).

* cited by examiner

SYSTEMS AND METHODS FOR IMPROVED STABILITY OF POWER SYSTEMS

This invention was made with Government support under contract number DE-OE0000626 awarded by the Department of Energy. The Government has certain rights in the invention.

BACKGROUND

The subject matter disclosed herein relates to power generation systems, and more specifically to techniques suitable for enhancing power system oscillatory stability using generation re-dispatch of power generation systems.

A power grid may include power generation systems suitable for generating electric power. The electric power may then be distributed and transmitted via an electric grid infrastructure for consumption by various entities, including residential households and commercial facilities. Power consumption may vary depending on the entities' needs and operations, among other factors. In modern power systems, there may be a large number of generators and associated controllers, there are many types of load, ranging from a simple resistive load to more complicated loads with electronic controllers. The influx of loads and different load types increase the complexity and nonlinearity of power systems. As a result power systems are complex nonlinear dynamical systems.

System operators may enhance operations of the grid system via generation re-dispatch, in which power generation facilities are reconfigured to improve power production and distribution under certain oscillation modes that may be encountered during operations. For example, power production systems may have multiple frequency modes of oscillation that are poorly damped. Damping of these modes leads to more stable power production, distribution and transmission. If not dampened, the oscillations may lead to undesired electric grid issues, and may become more frequent as the power production systems experience greater variability in their loading or customer demand. It may be useful to provide for techniques that improve the damping of such modes through generation re-dispatch of power generation systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides for a system including a processor. The processor is configured to select at least one grid system contingency from a plurality of grid system contingencies. The processor is further configured to derive one or more eigen-sensitivity values based on the at least one grid system contingency. The processor is also configured to derive one or more control actions at least partially based on the eigen-sensitivity values. The processor is additionally configured to apply the one or more control actions for generation re-dispatch of a grid system.

A second embodiment provides for a method including selecting, via a processor, at least one grid system contingency from a plurality of grid system contingencies. The method further includes deriving, via the processor, one or more eigen-sensitivity values based on the at least one grid system contingency. The method additionally includes deriving, via the processor, one or more control actions at least partially based on the eigen-sensitivity values. The method also includes applying, via the processor, the one or more control actions for generation re-dispatch of a grid system.

A third embodiment provides non-transitory computer readable medium storing instructions that when executed by a processor cause the processor to select at least one grid system contingency from a plurality of grid system contingencies. The instructions further cause the processor to derive one or more eigen-sensitivity values based on the at least one grid system contingency. The instructions also cause the processor to derive one or more control actions at least partially based on the eigen-sensitivity values. The instructions additionally cause the processor to apply the one or more control actions for generation re-dispatch of a grid system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure describes techniques suitable for improving oscillatory stability through generation re-dispatch. As further described herein, a sensitivity factor and optimization based approach for proactively identifying certain control elements and their optimal control action suitable for solving a power system inter-area oscillatory problem in real-time or near real-time is provided. The control elements and actions may include generator active power re-dispatch, load shedding, capacitor bank switching, and so on. In one embodiment, a sensitivity of an eigenvalue with respect to change in control variables is determined by perturbing a power system model. The perturbation may result in information suitable to be used as an input to a constrained optimization problem. The optimization problem may be configured to provide for a minimum amount of damping for the power system. The optimization problem may then be solved by using an objective, such as minimizing a total amount and cost of certain control action(s).

Advantageously, the techniques described herein provide for a more proactive determination of targeted eigenvalues that may increase grid stabilization for credible 'what if' scenarios, such as scenarios where generator systems become unavailable, scenarios where distribution lines are down, and so on. A tool, such as a software-based tool, a hardware-based tool, or combination thereof, may be created and disposed in a utility control room and will take as input solved power flow cases, associated dynamic models, and critical contingencies and derive as output a more optimal control action that may solve oscillation problems.

Figure 1:
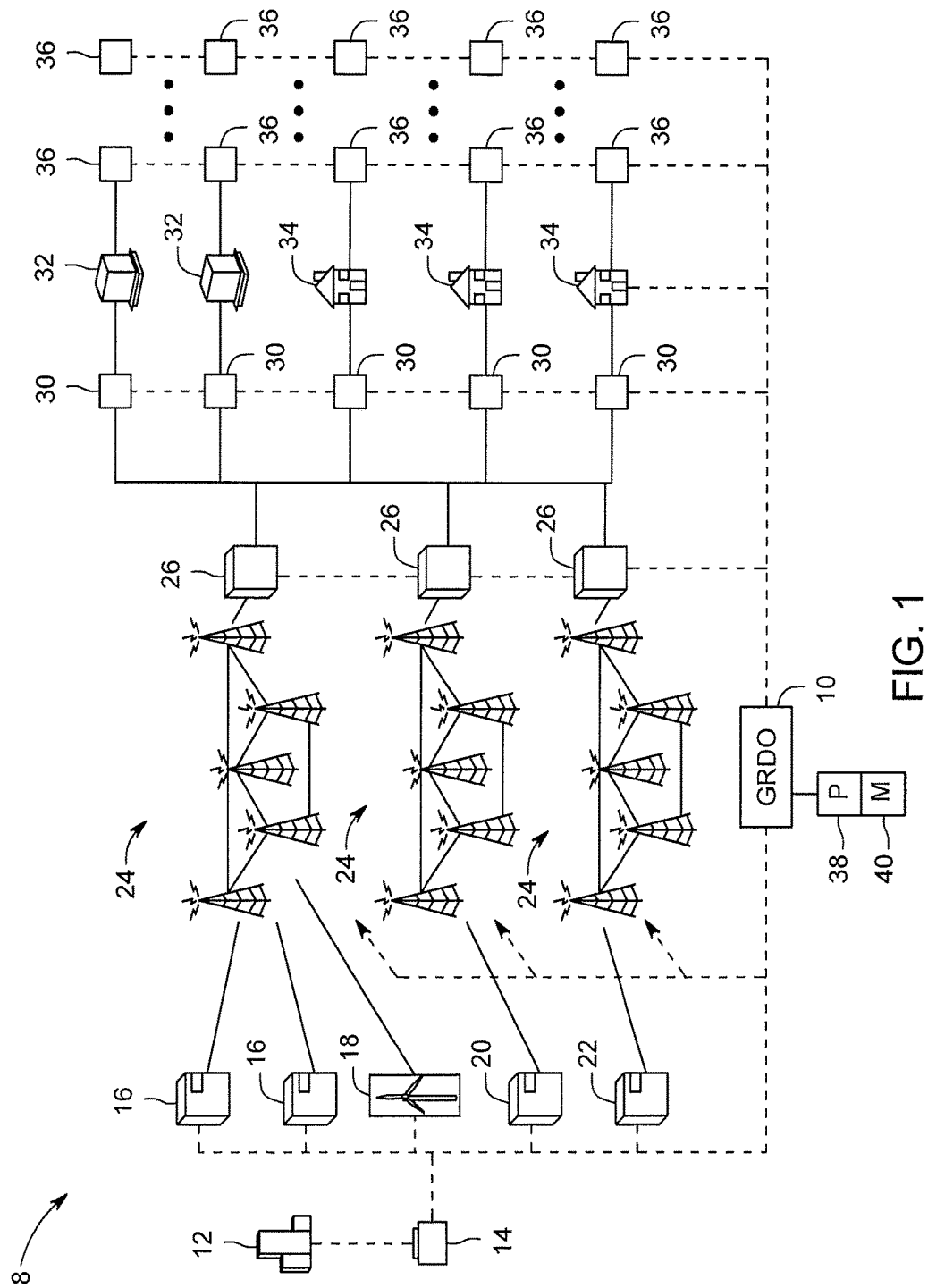
FIG. 1 is a block diagram of an embodiment of a power generation, transmission, and distribution system.

With the foregoing in mind, it may be useful to describe an embodiment of a system, such as a power grid system 8 operatively coupled to a generation re-dispatch optimization (GRDO) system 10, as illustrated in FIG. 1. As depicted, the power grid system 8 may include one or more utilities 12. The utility 12 may provide for power production and oversight operations of the power grid system 8. For example, utility control centers 14 may monitor and direct power produced by one or more power generation stations 16 and alternative power generation stations 18. The power generation stations 16 may include conventional power generation stations, such as power generation stations using gas, coal, biomass, and other carbonaceous products for fuel. The alternative power generation stations 18 may include power generation stations using solar power, wind power, hydroelectric power, geothermal power, and other alternative sources of power (e.g., renewable energy) to produce electricity. Other infrastructure components may include a water power producing plant 20 and geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through a power transmission grid 24. The power transmission grid 24 may cover a broad geographic region or regions, such as one or more municipalities, states, or countries. The transmission grid 24 may also be a single phase alternating current (AC) system, but most generally may be a three-phase AC current system. As depicted, the power transmission grid 24 may include a series of towers to support a series of overhead electrical conductors in various configurations. For example, extreme high voltage (EHV) conductors may be arranged in a three conductor bundle, having a conductor for each of three phases. The power transmission grid 24 may support nominal system voltages in the ranges of 110 kilovolts (kV) to 765 kilovolts (kV). In the depicted embodiment, the power transmission grid 24 may be electrically coupled to distribution systems (e.g., power distribution substation 26). The power distribution substation 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 230V, or 120V) distribution voltages.

Advanced metering infrastructure meters (e.g., smart meters) 30 may be used to monitor and communicated power related information based on electric power delivered to commercial consumers 32 and residential consumers 34. For example, the smart meters 30 may include one and/or two-way communications with the grid 8 and the GRDO 10 suitable for communicating a variety of information, including power usage, voltage, frequency, phase, power quality monitoring, and the like. The smart meters 30 may additional receive information, for example, demand response actions, time-of-use pricing information, remote service disconnects, and the like.

The customers 32, 34 may operate a variety of power consuming devices 36, such as household appliances, industrial machinery, communications equipment, and the like. In certain embodiments, the power consuming devices 36 may be communicatively coupled to the grid system 8, the GRDO 10, and/or the meters 30. For example, the power consuming devices 36 may include switches that may be actuated remotely to turn on/off the devices 36 and/or to vary power consumption (e.g., lower or rise heating ventilation and air conditioning [HVAC] temperature set points). The smart meters 30 and the power consuming devices 36 may be communicatively coupled, for example, through a home area network (HAN), (for residential customers 34), wireless area network (WAN), powerline network, local area network (LAN), mesh network and the like.

As mentioned earlier the GRDO 10 may be operatively coupled to the grid system 8 (smart grid) and used to more efficiently manage generation re-dispatch. The GRDO 10 may be a software system and/or a hardware system. Accordingly, the GRDO 10 may include a processor 38 suitable for executing computer code or instructions stored in the memory 40. The GRDO 10 may provide control signals to a variety of devices in the grid system 10 that can be controlled, such as generator systems, power storage systems, and loads. In one embodiment, the GRDO 10 may be disposed in utility control center 14 and may be used to observe and manage grid 8 behavior, including oscillation mode behavior. For example, the GRDO 10 may be continuously logging data from the grid 8 to adjust certain computations, such as sensitivity factors, eigenvalue-based models, constraint optimization problems, and so on to provide for a more optimal response to oscillation modes. The GRDO 10 may then provide for derivations suitable for managing generator active power re-dispatch, load shedding, capacitor bank switching, and so on. By providing for a dynamic system suitable for responding to a variety of oscillation modes, the GRDO 10 may result in a more optimal management of the grid system 8, including responses to a variety of oscillatory conditions.

Figure 2:
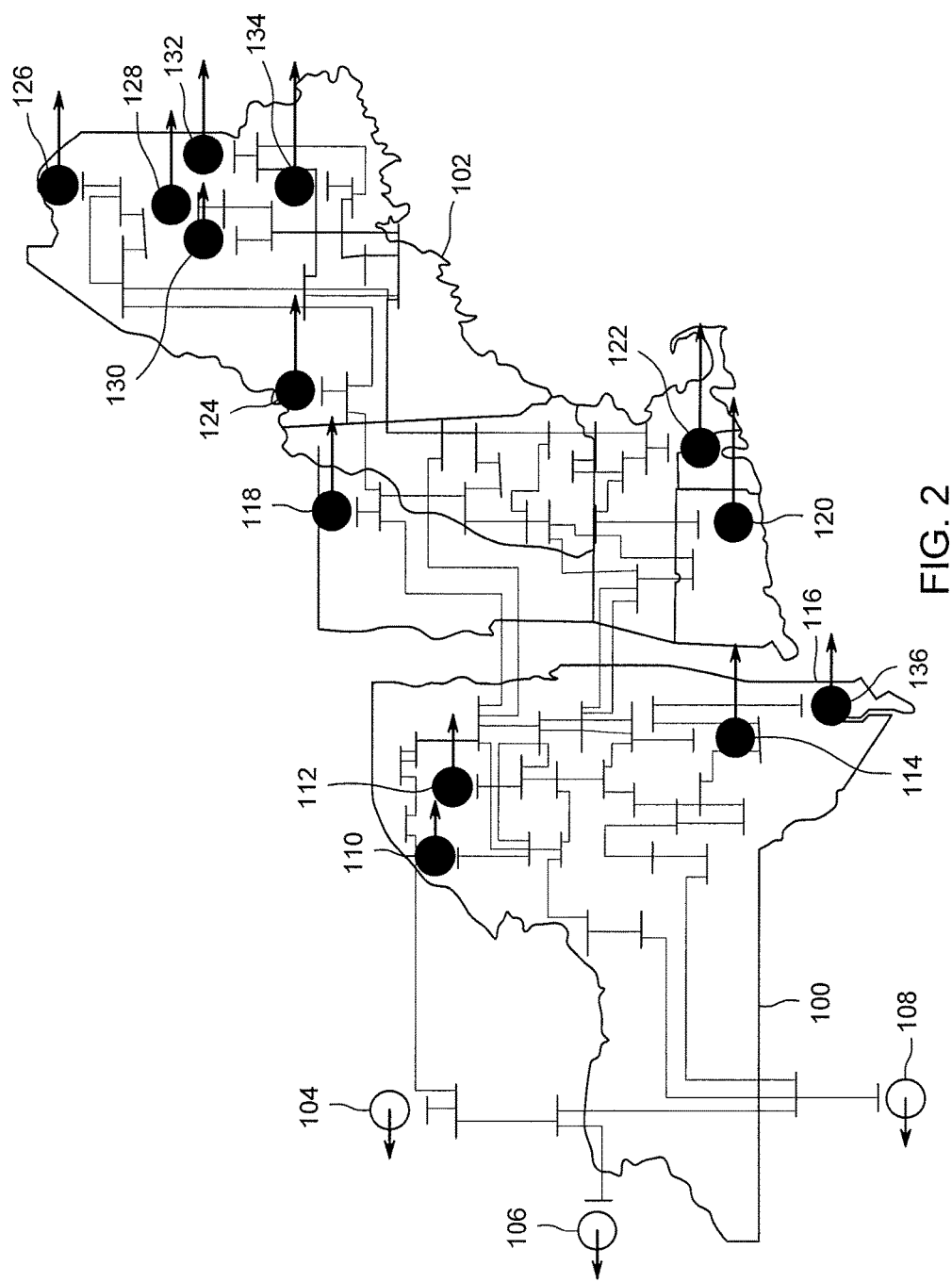
FIG. 2 is a grid diagram of an embodiment of a mode-shape grouping of generator systems.
Figure 3:
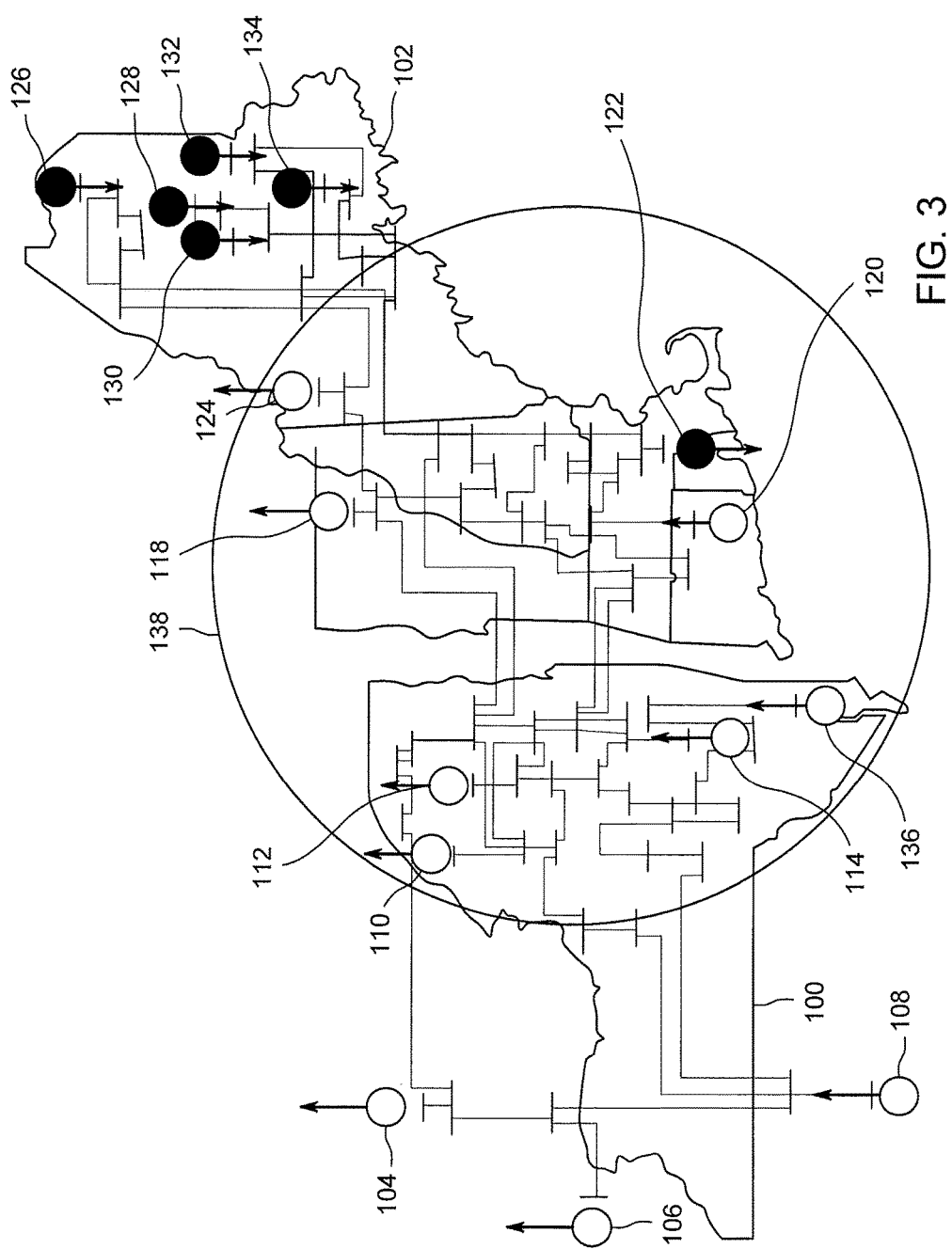
FIG. 3 a grid diagram of an embodiment of a eigen-sensitivity grouping of generator systems.

FIGS. 2 and 3 depict embodiments of grid diagrams of geographically localized portions of the grid 8, depicting certain groupings of power generation systems. As depicted in FIG. 2, a geographic area 100 and 102 are depicted. The geographic areas 100 and 102 may be served by generators 104-136. That is, electric power from generators 104-136 may be used to operate electric devices or loads in the geographic areas 100, 102. Icons depicting the generators 104-136 include vectors or arrows representative on oscillation direction during a certain mode of oscillation. In the depicted embodiment of FIG. 2, the mode may include a frequency of between 0.3 Hz and 0.5 Hz with a damping of between 6% and 8%. The generators 104, 106, 108 are shown as oscillating against the generators 110-136 in the figure. Further, the generators 104-136 of FIG. 2 are grouped by mode-shape.

To group by mode shape, a right eigenvector $\phi$ of a system matrix (e.g., matrix representative of grid 8) may be derived, representative of a participation of certain generators (e.g., generators 104-136) in a particular mode, e.g., the mode shown in FIG. 2 with a frequency of between 0.3 Hz and 0.5 Hz with a damping of between 6% and 8%. The significance of the participation of each generator 104-136 in the specific mode is derived by mode shape $\phi$. Mode shape $\phi$ may be solved through eigenvalue and eigenvector analysis such as solving for:

$$\frac{\partial \lambda_i}{\partial \gamma} \Delta \gamma \approx \frac{\psi_i \Delta A_{sys} \phi_i}{\psi_i \phi_i},\qquad \text{Equation (1)}$$

where $\lambda$ is the eigenvalue, $A_{sys}$ is the system matrix, $\gamma$ is a parameter representing the generation or load, $\phi$ is mode shape (i.e., right eigenvector of $A_{sys}$), $\psi$ is the left eigenvector of $A_{sys}$, and i is representative of a specific generator (e.g., generators 104-136).

By applying mode shape grouping, the generators 104-136 may be depicted having arrows representative of oscillation direction. The techniques described herein may provide for eigen-sensitivity grouping, as shown in FIG. 3. In eigen-sensitivity grouping, rather than relying solely on the mode shape $\phi$, eigen-sensitivity derives how a small perturbation in a particular generator's power (e.g., one of generators 104-136) affect the eigenvalue corresponding to the particular mode of interest. In other words, the entirety of Equation 1 is considered to determine the change in the eigenvalue based on the small change in generator power. Accordingly, if you group generators (e.g., generators 104-136) based on eigen-sensitivity, a more focused eigen-sensitivity group 138 may be provided. As shown, the eigen-sensitivity group 138 includes generators 110, 112, 114, 118, 120, 122, 124, and 136. By providing for eigen-sensitivity and a more focused eigen-sensitivity group (e.g., group 138), the techniques described herein may provide for a more efficient and improved generation re-dispatch. For example, the techniques described herein may derive 1) which generators should increase output and which generators should decrease output; 2) which generators will be more effective in impacting certain oscillation modes; 3) what is a more optimum amount of generation re-dispatch suitable for damping the oscillation; and 4) how to better avoid negative interaction between multiple oscillation modes.

Figure 4:
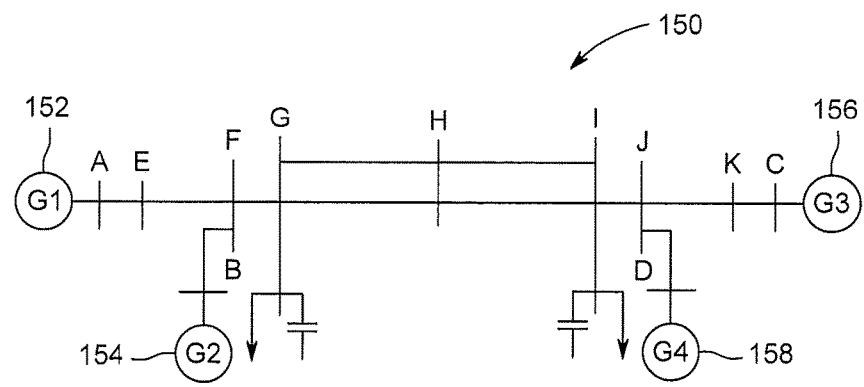
FIG. 4 is a schematic diagram depicting an embodiment of four generator system interconnected by eleven distribution lines.

Turning now to FIG. 4, the figure is a schematic diagram of an embodiment of a four generator power production and distribution system 150 suitable for deriving $\sigma$, damping ratios, and/or settling times, where $\sigma$ is the real part of the eigenvalue $\lambda$, as opposed to the imaginary part, which is denoted by $\omega$. Lower $\sigma$ correspond to higher damping rations and lower settling times (e.g., time to dampen oscillation). By deriving $\sigma$, the damping rations and settling times can be derived. To derive $\sigma$ or the eigenvalue sensitivity, a generator system, e.g., G1 denoted via numeral 152, the generator system G1 is perturbed by a small amount, say increasing power by 100MW, and, in one embodiment, the remainder generator systems (e.g., generator system G2 denoted by numeral 154, generator system G3 denoted by numeral 156, and generator system G4 denoted by numeral 158), are perturbed equally among each other (e.g., each perturbed by reducing power 33.33MW) to arrive at a total perturbation system-wide of zero. New eigenvalue(s) $\lambda$ corresponding: to the perturbation scenario are the computed. Sensitivities S $$\frac{\Delta \sigma}{\Delta P},$$

and/or $$\frac{\Delta \omega}{\Delta P}$$

may thus be computed based on the eigenvalue $\lambda$'s real part $\sigma$, imaginary part $\omega$, and P, where P is the perturbed power (e.g., 100MW). In another, the remainder generator systems (e.g., generator system G2 denoted by numeral 154, generator system G3 denoted by numeral 156, and generator system G4 denoted by numeral 158) may be perturbed unequally among each other, but with the total system-wide perturbation of zero.

Additionally, certain contingencies, such as N-1 contingencies may be identified and used during the eigen-sensitivity derivations. N-1 contingencies may refer to the offlining of one system, such as a generator system or a power transmission line. For example, certain contingencies such as any one of power transmission lines A-K going down, generator system G1-G4 going down, and/or combinations thereof, may be taken into account, and power outputs adjusted to provide for desired oscillatory mode damping. First, the eigen-sensitivities S may be computed for each generator system G1-G4 (or other power source, such as capacitor banks) under post contingency conditions (i.e., after the contingency has occurred). In one embodiment, a certain equation as shown below may be used.

$$\Delta \sigma_{target} = \sigma_{post\text{-}target} - \sigma_{post} \qquad \text{Equation (2):}$$

where $\sigma_{post}$ corresponds to $\sigma$ computed post contingency (e.g., after a generator or line goes down), and $\sigma_{post\text{-}target}$ corresponds to a target a that is desired to be achieved post contingency. Accordingly, multiple $\Delta \sigma_{target}$ may be derived, each one based on certain contingencies. $\Delta \sigma_{target}$ may then be used to compute $\sigma_{target}$ as defined below.

$$\sigma_{target} = \Delta \sigma_{target} + \sigma_{base} \qquad \text{Equation (3):}$$

where $\sigma_{base}$ corresponds to a base case $\sigma$ (e.g., pre contingency operations). The system 8 may then be operated to meet $\sigma_{target}$. Operating the system 8 to meet the $\sigma_{target}$ may result in the worst case $\sigma$ equal to $\sigma_{post\text{-}target}$ post contingency, which has to be set to a desired value suitable for operating at a desired damping ratio and/or post target settling time. Accordingly, the system post re-dispatch may better respond to the contingency. Indeed, the techniques described herein may be applied so that the system 8 includes a desired damping ratio and/or arrives at a desired settling time even should certain contingencies (e.g., downed lines, inoperable generators) occur.

Figure 5:
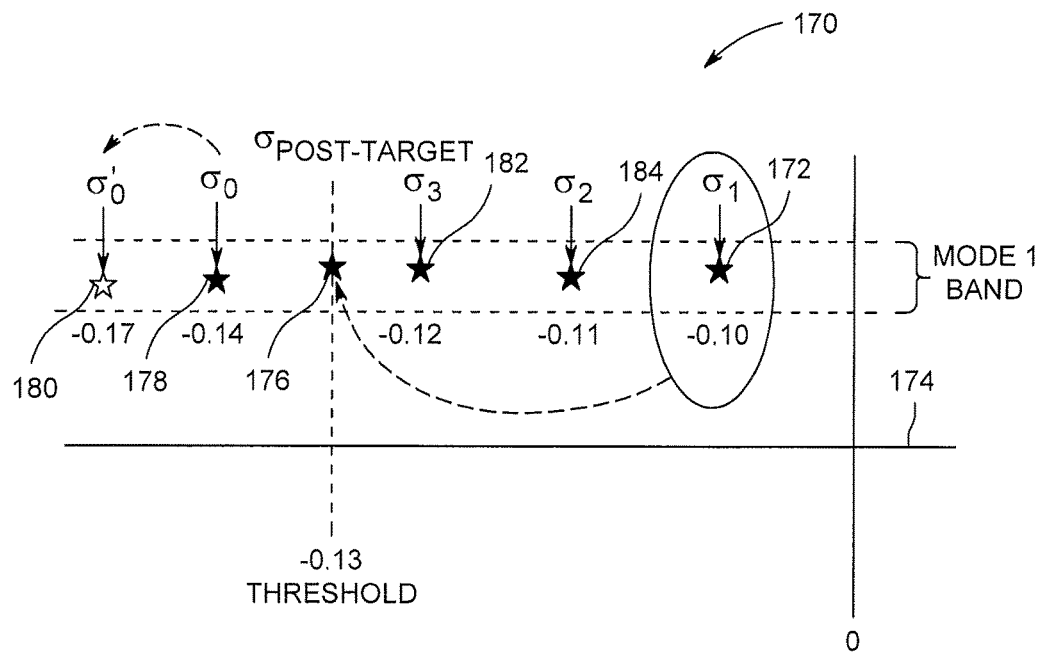
FIG. 5 is a graph depicting eigenvalue real part sensitivities and a threshold suitable for improved generation re-dispatch.

It may be useful to pictorially show the derivations described above. Accordingly, FIG. 5 depicts an embodiment of graph 170 showing a base case $\sigma_0$ 178 (e.g., pre-contingency case) having a value of –0.14. $\sigma_1$ 172, $\sigma_2$ 184, and $\sigma_3$ 182 are the sigmas corresponding to three contingencies, with values of –0.10, –0.11 and –0.12 respectively. The values show in FIG. 5 are for example only, and it is noted that other values or ranges of values may be used. For a system to be stable for certain (or all) possible contingencies, the post contingency sigma needs to be at or beyond a threshold, such as –0.13. It is to be noted that the threshold value of –0.13 is for example use, and other values may be derived or provided. An objective, as shown in the figure, is to "move" or change the operating condition of the base case 178 such that, for example, all critical contingencies lie at or beyond a desired threshold. In this embodiment, $\sigma_1$ may correspond to the worst contingency, because its value is nearest to zero. In the depicted embodiment, it may be desired to move $\sigma$1 172 from its current position in axis 174 to at least a threshold $\sigma_{target}$ 176 having a value of –0.13, which may be representative of a certain damping ratio (e.g., 5-8%) and/or a certain settling time (e.g., 10-40 seconds). It is to be noted that the values described herein are examples only, and any number of values may be used. The amount suitable for moving $\sigma$1 172 to $\sigma_{target}$ 176 is –0.03 (i.e., –0.10 added to –0.13).

To maintain the contingency case at the desired threshold (e.g., –0.13), we would then move from the current position of –0.14 to a new position –0.17, resulting in a $\sigma_0$ 180 that may provide for the desired damping ratio (e.g., 5-8%) and/or a certain settling time (e.g., 10-40 seconds) post contingency. Since the amount of re-dispatch is determined based on the worst contingency, the remaining less severe contingencies implicitly would become stable post-dispatch.

It may also be useful to provide for a specific example, say a contingency where line G-H in FIG. 4 is down in mode 1 (e.g., mode where frequency is between 0.3 Hz and 0.5 Hz with a damping of between 6% and 8%. Eigen-sensitivity S (e.g., $$\frac{\Delta \sigma}{\Delta P}, \text{ and/or } \frac{\Delta \omega}{\Delta P})$$

may be computed for mode 1, so that a post contingency $\sigma_{post}$ is derived to be –0.12 and a $\sigma_{base}$ is derived to be –0.08. The operator of the system 8 may desire that a post contingency target be set to –0.13. Accordingly, Equation 2 leads to $\Delta\sigma_{target}$=–0.13–0.12=–0.25. Then Equation 3 leads to $\sigma_{target}$=–0.25+(–0.08)=–0.33. Accordingly, it would be beneficial to manage re-dispatch to maintain 0.33 as target $\sigma$.

Certain techniques, such as quadratic programming (QP) may be used to determine a QP optimal re-dispatch so as to provide for the target $\sigma$. For example, for mode 1:

$$\min J = \sum_{i=1}^{N_g} \Delta P_i^2 \qquad \text{Equation (4):}$$

where min J is representative of the minimum generation re-dispatch, $N_g$ is the total number of generators, $\Delta P_i$ is the amount of re-dispatch for generator i. min J is then subject to constraints:

$$\sum_{i=1}^{N_g} \Delta P_i = 0; \qquad \text{Equation (5)}$$

and $$\sigma_{target} = \sigma_{base} + \sum_{i=1}^{N_g} \Delta P_i S_i \qquad \text{Equation (6)}$$

$$P_{min}^i \leq \Delta P_i \leq P_{max}^i; \qquad \text{Equation (7)}$$

and $$\omega_{min}^i \leq \sum_{i=1}^{N_g} \Delta P_i \frac{d\omega}{dP_i} \leq \omega_{max}^i \qquad \text{Equation (8)}$$

where $S_i$ is the sensitivity of the real-part of the eigenvalue to change in power of ith generator; $\sigma_{base}$ is the real-part of the eigenvalue for the base case; $\sigma_{target}$ is the targeted or desired real-part of the eigenvalue post-dispatch; $P_{min}^i$ is a minimum desired re-dispatch for generator i; $P_{max}^i$ is a maximum limit for re-dispatch for generator i (typically set to 1 per unit); and $\omega_{min}^i$ and $\omega_{max}^i$ are min and max constraints, respectively, on the deviation in imaginary part of the eigenvalue for generator i.

In addition to power producing devices or power storage devices (e.g., generators, capacitor banks), the techniques described herein may incorporate load changes. Indeed, any number of devices whose power can be controlled can be re-dispatched using the techniques described herein. Indeed, while a number of load points (e.g., 34, 36 in FIG. 1) may considerably exceed a number of generation points in the system 8, the eigen-sensitivity $S_L$ for loads may be computed and used. Once the $S_L$ is computed, the $S_L$ may be used as described above instead of S. To compute eigen-sensitivity of the loads, a first step may compute the generating areas using sensitivity information in two groups, where group 1 corresponds to positive sensitivities, and group 2 to negative sensitivities. A second step may then decrease aggregated loads $L_1$ in group 1 and distribute the decrement among all generators across the system 8 to compute $S_L=\Delta\sigma/\Delta P_L$. A third and final step may then repeat the second step to compute $S_L$ for $L_2$. It is to be understood that other techniques may be used additional or alternative to QP, including gradient-based optimization techniques (e.g., gradient descent method, conjugate gradient method, non-linear conjugate gradient method).

Based on the derivations above, a simulation may be executed to verify that the solution min J operates as desired. For example, a simulator that includes the system 8 or portions of the system 8 (e.g., regions 100, 102 of FIGS. 2 and 3) may execute a simulation of the re-dispatch, including a simulation that incorporates N–1 contingencies. Should simulation work as desired, the operator may then initiate the dispatch and allocate power accordingly.

Figure 6:
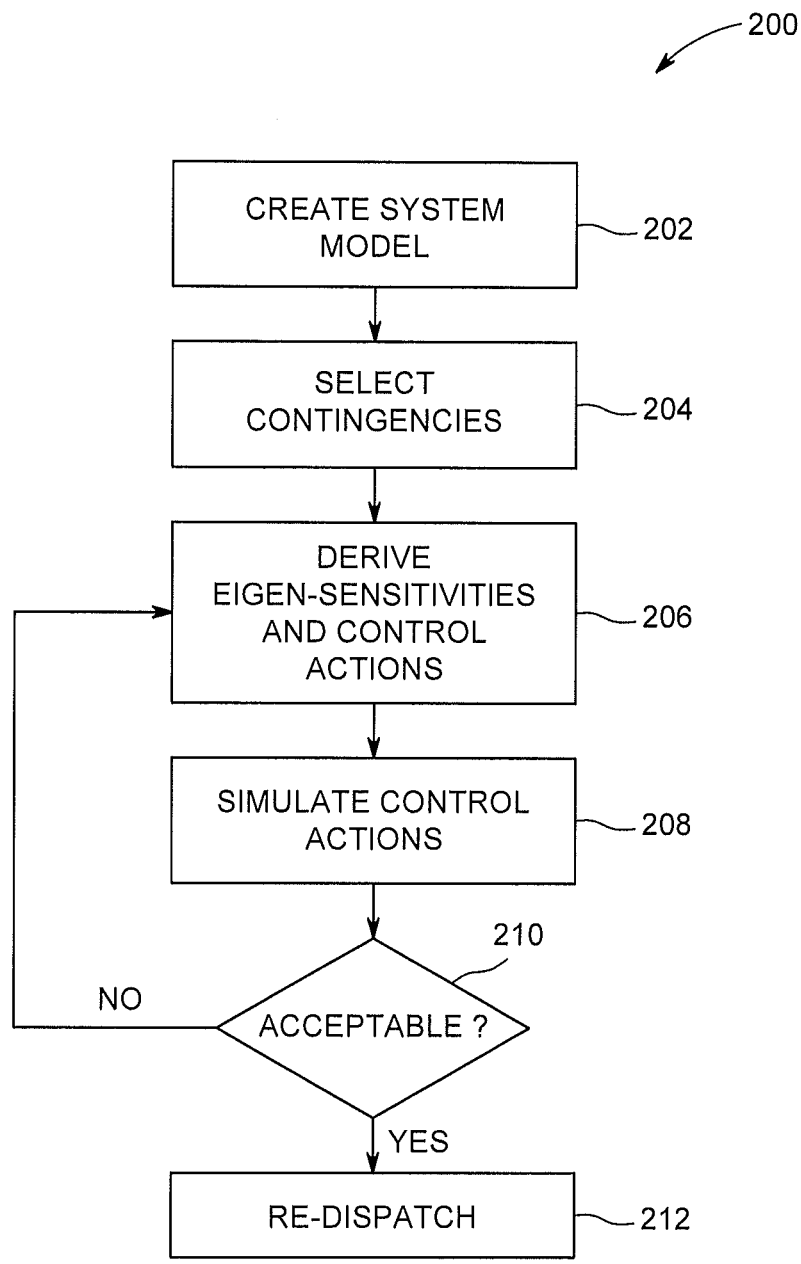
FIG. 6 is a flowchart of an embodiment of a process suitable for improved generation re-dispatch that includes N−1 contingencies.

FIG. 6 depicts an embodiment of a process 200 suitable for providing for eigen-sensitivity based re-dispatch for generator systems including re-dispatch that account for contingencies in the grid system 8. The process 200 may be implemented as computer code or instructions executable by the processor 38 and stored in the memory 40. In the depicted embodiment, the process 200 may create (block 202) a model of the grid system 8 or a portion of the grid system 8 (e.g., portions 100, 102) suitable for simulation. The model may include any device whose power may be controlled, including generator systems, loads, power storage systems and so on. The model may also include a plurality of power delivery lines interconnecting the various devices.

A set of contingencies, including N–1 contingencies, may then be selected (block 204). For example, contingencies that have a higher probability of occurrence (e.g., older lines that may go down, generators that may be scheduled to go offline), contingencies that historically occur at certain times of the year, and so on, may be selected (block 204). The process 200 may then derive (block 206) eigen-sensitivities S and related derivations (e.g., $$\frac{\Delta\sigma}{\Delta P}, \frac{\Delta\omega}{\Delta P},$$

$\Delta\sigma_{target}$, $\Delta\sigma_{post-target}$, $\Delta\sigma_{post}$, $\sigma_{target}$, $\sigma_{base}$) and control actions. The control actions may include deriving min J and related derivations suitable for providing re-dispatch operations, including control signals that may increase and/or decrease power production, delivery, and consumption.

The process 200 may then simulate (block 208), for example, control actions by applying the control actions to the model that was created at block 202. Simulation results may then be deemed acceptable or not acceptable (decision 210). If acceptable (decision 210), the control actions may then be applied to re-dispatch (block 212). As mentioned above, control signals may be transmitted to increase and/or decrease power production, power delivery, and power consumption. If not acceptable (decision 210), the process 200 may then enable an operator to make changes (e.g, select different eigen-sensitivity groupings, inputs to models, control actions, and so on) and iterate to block 206 so that new derivations and/or control actions may be computed. In this manner, the techniques describe herein provide for enhanced re-dispatch operations.

Technical effects include executing eigen-sensitivity based re-dispatch control actions. Eigen-sensitivity groups may be selected, alternative to or in addition to mode shape groups. Eigen-sensitivity based derivations may account for contingencies, such as N−1 contingencies that may occur in a grid system. Contingencies may include generator systems and/or power lines going offline. The eigen-sensitivity based derivations may provide for desired damping ratios and/or settling times responsive for given oscillatory modes. The eigen-sensitivity based derivations may also include control actions suitable for more efficient and responsive re-dispatches. The control actions may be simulated to provide for verification and validation before use. The control actions may then be implemented, for example, by transmitting control signals suitable for increasing and/or decreasing power production, power delivery, and power consumption.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a processor configured to:
select at least one grid system contingency from a plurality of grid system contingencies;
derive one or more eigen-sensitivity values based on the at least on grid system contingency;
derive one or more control actions at least partially based on the eigen-sensitivity values;
apply a quadratic programming to solve an optimization problem to derive the one or more control actions, wherein the optimization problem comprises min J=$\Sigma_{i=1}^{N_g}\Delta P_i^2$ where $N_g$ is a total number of generator systems included in the grid system, min J is a representative of a minimum generation re-dispatch and $\Delta P_i$ is an amount of re-dispatch power for each generator system i of the generator systems; and
apply the one or more control actions for generation re-dispatch of a grid system, wherein the grid system is controlled based on the one or more control actions.

2. The system of claim 1, wherein the processor is configured to derive the one or more eigen-sensitivity values by perturbing a power of a generator system included in a plurality of generator systems via a perturbation and to distribute the perturbation among a remainder of the plurality of generator systems.

3. The system of claim 2, wherein the perturbation is distributed equally among the remainder of the plurality of generator systems.

4. The system of claim 1, wherein a first eigenvalue of the one or more eigenvalues comprises a base case $\sigma_{base}$ representative of a base case settling time for a specific oscillation mode of the grid system.

5. The system of claim 1, wherein a second eigenvalue of the one or more eigen/values comprises a post-contingency case $\sigma_{post}$ having a settling time after the grid system contingency for a specific oscillation mode of the grid system.

6. The system of claim 4, wherein the processor is configured to move the base case $\sigma_{base}$ so that a settling time corresponding to a post-redispatch post-contingency condition lies beyond a threshold representative of a desired damping ratio, a desired settling time, or a combination, thereof.

7. The system of claim 4, wherein a third eigenvalue of the one or more eigenvalues comprises a $\sigma_{target}$ and wherein the processor is configured to derive the $\sigma_{target}$ by using the $\sigma_{base}$ and a $\Delta\sigma_{target}$.

8. The system of claim 7, wherein the processor is configured to derive the $\Delta\sigma_{target}$ by applying a $\sigma_{post-target}$ and a $\sigma_{post}$, wherein the $\sigma_{post-target}$ is representative of a target settling time after the grid system contingency and wherein the $\sigma_{post}$ comprises a settling time after the grid system contingency.

9. The system of claim 1, comprising simulating the one or more control actions to determine if the one or more control actions are acceptable, and if acceptable, to apply the control actions for the generation re-dispatch.

10. A method, comprising:
selecting, via a processor, at least one grid system contingency from a plurality of grid system contingencies;
deriving, via the processor, one or more eigen-sensitivity values based on the at least on grid system contingency;
deriving, via the processor, one or more control actions at least partially based on the eigen-sensitivity values;
applying a quadratic pro ramming to solve an optimization problem to derive the one or more control actions, wherein the optimization problem comprises min J=$\Sigma_{i=1}^{N_g}\Delta P_i^2$ where $N_g$ is a total number of generator systems included in the grid system, min J is a representative of a minimum generation re-dispatch and $\Delta P_i$ is an amount of re-dispatch power for each generator system i of the generator systems; and applying, via the processor, the one or more control actions for generation re-dispatch of a grid system.

11. The method of claim 10, wherein deriving, via the processor, the one or more eigen-sensitivity values comprises perturbing a power of a generator system included in a plurality of generator systems via a perturbation and to distribute the perturbation among a remainder of the plurality of generator systems.

12. The method of claim 10, comprising creating, via the processor, a simulation model of the grid system, wherein the simulation model comprises one or more generation systems, one or more loads, and one or more power lines electrically coupling the one or more generation systems to the one or more loads, wherein deriving, via the processor, the one or more eigen-sensitivity values comprises perturbing a power of a generator system included in a plurality of generator systems via a perturbation and to distribute the perturbation among a remainder of the plurality of generator systems, and wherein perturbing the power comprises executing a simulation of the simulation model.

13. The method of claim 9, wherein deriving, via the processor, one or more eigen-sensitivity values comprises deriving, via the processor, one or more load-based eigen-sensitivity values, and wherein the one or more control actions comprises a control of one or more loads configured to receive power from the grid system.

14. A non-transitory computer readable medium storing instructions that when executed by a processor cause the processor to:
select at least one grid system contingency from a plurality of grid system contingencies;
derive one or more eigen-sensitivity values based on the at least on grid system contingency;
derive one or more control actions at least partially based on the eigen-sensitivity values;
to apply a quadratic programming to solve an optimization problem to derive the one or more control actions, wherein the optimization problem comprises min $J=\Sigma_{i=1}^{N_g} \Delta P_i^2$ where $N_g$ is a total number of generator systems included in the grid system, min J is a representative of a minimum generation re-dispatch and $\Delta P_i$ is an amount of re-dispatch power for each generator system i of the generator systems; and
apply the one or more control actions for generation re-dispatch of a grid system.

15. The non-transitory computer readable medium of claim 14, wherein the instructions that cause the processor to derive the one or more eigen-sensitivity values comprise instructions that cause the processor to perturb a power of a generator system included in a plurality of generator systems via a perturbation and to distribute the perturbation among a remainder of the plurality of generator systems.

16. The non-transitory computer readable medium of claim 14, wherein the one or more eigen-sensitivity values comprise a base case $\sigma_{base}$ representative of a base case settling time for a specific oscillation mode of the grid system, and wherein the instructions comprise instructions that cause the processor to move the base case $\sigma_{base}$ so that the base case $\sigma_{base}$ lies beyond a threshold representative of a desired damping ratio, a desired settling time, or a combination, thereof.

17. The non-transitory computer readable medium of claim 14, comprising instructions that cause the processor to simulate the one or more control actions to determine if the one or more control actions are acceptable, and if acceptable, to apply the control actions for the generation re-dispatch.

* * * * *